(12) United States Patent
Oba et al.

(10) Patent No.: US 8,521,607 B2
(45) Date of Patent: Aug. 27, 2013

(54) ARCHIVING SYSTEM AND PROCESS FOR TRANSACTION RECORDS

(75) Inventors: Kazutaka Oba, Johns Creek, GA (US); Tomoki Hattori, Suwanee, GA (US)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 13/032,419

(22) Filed: Feb. 22, 2011

(65) Prior Publication Data

US 2012/0215650 A1 Aug. 23, 2012

(51) Int. Cl.
*G06Q 30/00* (2012.01)
(52) U.S. Cl.
USPC .......................................... 705/26.1
(58) Field of Classification Search
USPC .......................................... 705/26.1
See application file for complete search history.

(56) References Cited

U.S. PATENT DOCUMENTS

2008/0208749 A1* 8/2008 Wallace et al. ................. 705/44
2009/0164518 A1* 6/2009 Ghafoor ..................... 707/104.1

* cited by examiner

*Primary Examiner* — Mila Airapetian
(74) *Attorney, Agent, or Firm* — Oblon, Spivak, McClelland, Maier & Neustadt, L.L.P.

(57) ABSTRACT

Systems and algorithmic processes directed to a user system, a provider system and a storage system. The provider system receives, from the user system, a request for a transaction to be performed by the provider system. The requested transaction includes a purchase of goods or a conduction of services between a user of the user system and a provider of the provider system. Upon completion of the request, the provider system transmits a record of the transaction to the storage system. The storage system is independent of the user system and the provider system. The record includes details of the transaction including the goods purchased or services conducted between the user and the provider.

18 Claims, 8 Drawing Sheets

Transaction Confirmation

| | |
|---|---|
| Money Transfer | |
| Transfer amount: | $100.00 |
| | |
| From Account Number: | 000000-01 |
| Bank: | Bank 1 |
| | |
| To Account Number: | 000000-02 |
| Bank: | Bank 2 |
| | |
| Customer Name: | User's Name |
| E-mail address: | name@domain.com |
| Transfer request date: | 1/1/2011 |
| Transfer Status: | Pending |

*Fig. 8*

Transaction Confirmation

| | |
|---|---|
| Pay to the order of: | Utility |
| Account Number: | 000000-00 |
| Customer Name: | User's Name |
| E-mail address: | name@domain.com |
| Payment date: | 1/1/2011 |
| Payment Status: | Paid |
| | |
| Payment Type: | Credit Card |
| Account number: | ****-1234 |
| Expiration date: | 1/2012 |
| Name on Card: | Name |
| Tracking number: | 123456789 |
| Payment Total: | $20.00 |
| | |
| Transactions summary | |
| | |
| Transaction 1 | |
| Status: | Accepted |
| Apply payment to: | Utility Bill |
| Total: | $19.00 |
| | |
| Transaction 2 | |
| Status: | Accepted |
| Apply payment to: | Convenience fee |
| Total: | $1.00 |

Metadata Window – Transaction.PDF

File Name: Transaction.pdf
Customer: User's Name
Provider: Utility
User Email: name@domain.com
Date: January 1, 2011

Transaction 1
Payment: $19.00
Type: Credit Card
Purpose: Utility Bill

Transaction 2
Payment: $1.00

Fig. 10

Metadata Window – Transaction.PDF

File Name: Transaction.pdf
Customer: User's Name
Provider: Bank 1
User Email: name@domain.com
Date: January 1, 2011

Money Transfer
Amount: $100.00
From:
Bank: 000000-01
Bank 1
To:
Bank: 000000-02
Bank 2

ARCHIVING SYSTEM AND PROCESS FOR TRANSACTION RECORDS

BACKGROUND

1. Field of the Disclosure

This disclosure is related to archiving and record keeping systems for storing transaction records and documents, specifically transaction confirmation records. In particular, this disclosure is related to archiving records of web based transactions.

2. Description of the Related Art

The "background" description provided herein is for the purpose of generally presenting the context of this disclosure. Work described herein, to the extent it is described in this background section, as well as aspects of the description which may not otherwise qualify as prior art at the time of filing, are neither expressly or impliedly admitted as prior art against the present invention.

Web based or online transactions, including shopping or financial transactions generally involve a user accessing a web based provider system, through a user terminal system equipped with a web browser accessing the Internet. These transactions include the conduction of services, such as financial transactions (e.g., online banking) and the purchase of goods from a web based storefront (e.g., the online storefronts of EBAY Inc., San Jose, California, and AMAZON.COM, Inc., Seattle, Washington).

For such transactions, a user is generally provided with a record of the transaction once the transaction is completed. In some cases, the record is delivered to the user through the same web browser in which the transaction was performed via a refreshed web page on the web browser, or sent to the user by electronic mail (email). The provider, which provides or fulfils the transaction, usually generates the record of the transaction and internally stores the record. Other records generated by some web based providers may include tickets (e.g., a musical concert ticket or airplane ticket), which are sent to the user by regular mail.

As a provider-supported system, PAYPAL Inc. (a subsidiary of EBAY Inc.) of San Jose, California provides a product/service called PAYPAL, which is used for conducting online purchases and transactions. PAYPAL is an e-commerce service that operates as a third party broker between a user and a provider. In one aspect, a purchaser of a good from a merchant can send payment to PAYPAL Inc. PAYPAL Inc. then delivers the payment to the merchant. PAYPAL Inc. transmits a confirmation record to the provider and the purchaser. In another aspect, a user can transfer funds, through PAYPAL Inc., to another user. PAYPAL Inc. stores records of these transactions, and provides a web based interface for querying these records.

SUMMARY

The inventors have discovered various problems associated with such record keeping. In particular, no common standards or formats are used in delivering confirmation records to the user from various web based providers. In particular, a banking institute may not email a record of a wire transfer to a bank account, but rather may merely provide a confirmation screen with a confirmation number. On the other hand, an online merchant may provide a user with an email confirmation in addition to a display screen including details of the purchase transaction.

Even with email confirmations, however, a user may still lose confirmation records when those records are not permanently stored or printed. Further, data loss may occur in the user's personal computer or at the user's email service provider. In such situations, the user must rely entirely on the online provider's records, which may be incomplete, inaccurate or no longer available.

This disclosure is directed to accessing the details of an online transaction when such records are otherwise no longer available or destroyed, so that a transaction can be verified to determine whether a provider has correctly fulfilled the transaction. That is, when a product is bought from an online shopping site or money is transferred between bank accounts through an online transaction, the transaction can be reliably confirmed.

This disclosure is also directed to maintaining a copy of the transaction or record thereof as proof of the details of the transaction. In preferred aspects of this disclosure, this copy originates from a trusted or secure storage device so that a commercial vendor/provider (such as a financial institution or merchant) can verify the transaction by referring to the copy of the transaction from the trusted/secure storage device.

As noted above, PAYPAL Inc. can serve as a broker between a user and a provider, accepting payments for goods or services and archiving records thereof, thus providing a third party archival solution. However, this requires a user to submit payment (and any associated payment information) to PAYPAL Inc., which in turn transmits a payment to the provider, to complete a transaction between the user and the provider.

Aspects of this disclosure are directed to processes and systems which provide for archival of a transaction record by a third party without requiring the third party to broker the transaction. That is, no payment is submitted to the third party in direct association with the transaction between the user and the provider. However, it should be appreciated other financial arrangements (including payments) can be made to the third party for services provided by the third party (i.e. archiving the transaction record), including payments from the user and/or the provider. Such payments to the third party, however, are distinct from the transaction between the user and the provider, and thus distinct from using a broker such as PAYPAL Inc.

In aspects of this disclosure, a transaction is conducted directly between a provider and a user, without the use of a third party as a broker. Accordingly, in some regards, a payment from the user is made directly to the provider, or a transaction request for a service is made directly between the user and the provider. In some regards, the user makes payment only to the provider or conducts a request for a transaction only with the provider.

In further aspects, an account transfer, such as a money transfer, is conducted by a provider in response to a user request. Here, the user conducts the transaction directly with the provider, without using a third party as a broker. The provider will conduct the transaction or complete the transaction request, and a record of the transaction is transmitted to the third party for secure storage in response thereto.

A first aspect of this disclosure is directed to a method, process, computer-readable medium and apparatus of a provider system. The first aspect includes receiving, from a user system, a request for a transaction to be performed by a provider system, the transaction identifying a purchase of goods or a conduction of services between a user of the user system and a provider of the provider system. The first aspect also includes, in response to completing the transaction request, transmitting a record from the provider system to a storage system independent of the user system and the provider system. The record includes details of the transaction including the goods purchased or the services conducted between the user and the provider.

Preferably, the first aspect includes verifying the details of the transaction between the provider system and the storage system, wherein the verifying includes transmitting metadata extracted or read from the record by the storage system to the provider system, where the provider system compares the extracted/read metadata with an internal record of the transaction.

The first aspect also preferably includes transmitting, in response to determining the metadata matches the internal record of the transaction, an indication the record is verified to the storage system, causing the storage system to store the record. A further embodiment of the first aspect includes receiving, from the storage system, a confirmation the record has been stored by the storage system in response to the storage system storing the record.

The first aspect can include transmitting a request for the record to the storage system, receiving the record in response to the request thereof, and comparing the received record with an internal record of the transaction. In preferred embodiments concerning the purchase of goods, the completion of a transaction request includes a payment from the user to the provider, without the use of a broker, and a record is not transmitted to the storage system until the transaction request is completed.

In preferred embodiments, the first aspect includes transmitting a receipt from the provider system to the user system, where the receipt includes the details of the transaction. The details preferably include an email address of the user so that the record can be accessed by or delivered to the user, and the record is preferably generated as a file in the portable document format (PDF) including metadata identifying the details of the transaction. PDF is an open format created by ADOBE SYSTEMS INCORPORATED, Mountain View, California.

A second aspect of this disclosure is directed to a method, process, computer-readable medium and apparatus of a (secure) storage system. This second aspect includes receiving, from a provider system, a record of a completed request for a transaction between a user of a user system and a provider of the provider system, the transaction identifies a purchase of goods or conduction of services between the user and the provider. The record includes details of the transaction including the goods purchased or services conducted between the user and the provider, and the record is stored in a database independent of the user system and the provider system, preferably in response to the transaction request being completed.

In preferred embodiments, the second aspect includes verifying the details of the transaction between the storage system and one of the provider system and the user system, and/or extracting or reading metadata from the record. The verifying preferably includes transmitting the extracted/read metadata to the provider system or the user system, where the metadata is compared with an internal record of the transaction. The metadata can be created at any of the user system, the provider system and the storage system, as data embedded in file of the record or as a separate file. The metadata can also be encrypted or data hidden within the file of the record.

Also in preferred embodiments, the second aspect includes receiving, in response to determining the metadata matches the internal record of the transaction, an indication the record is verified, and storing, in response to receiving the indication the record is verified, the record in the storage system. As in the first aspect, in preferred embodiments concerning the purchase of goods, the completion of a transaction request includes a payment from the user to the provider, or a confirmation of a service to be performed, and a record is not transmitted to the storage system until the transaction request is completed.

In a further embodiment, the second aspect includes transmitting, from the storage system to at least one of the provider system and the user system, a confirmation the record has been stored by the storage system in response to the storage system storing the record. Preferably, the storing includes storing the record as a file in the portable document format (PDF) including metadata identifying the details of the transaction.

Also preferably, in the second aspect, the record includes an electronic mail (email) address of the user of the user system. Here, the second aspect includes transmitting the record to the user system in response to the user system (1) accessing the storage system via the email address and (2) requesting the record from the storage system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 shows a transaction confirmation transmitted to a user by a web browser interface, where the web browser includes a secure storage plug-in;

FIGS. 7-8 show examples of transaction records; and

FIGS. 9-10 show examples of metadata associated with the records shown in FIGS. 7-8, respectively.

DETAILED DESCRIPTION

Figure 1:
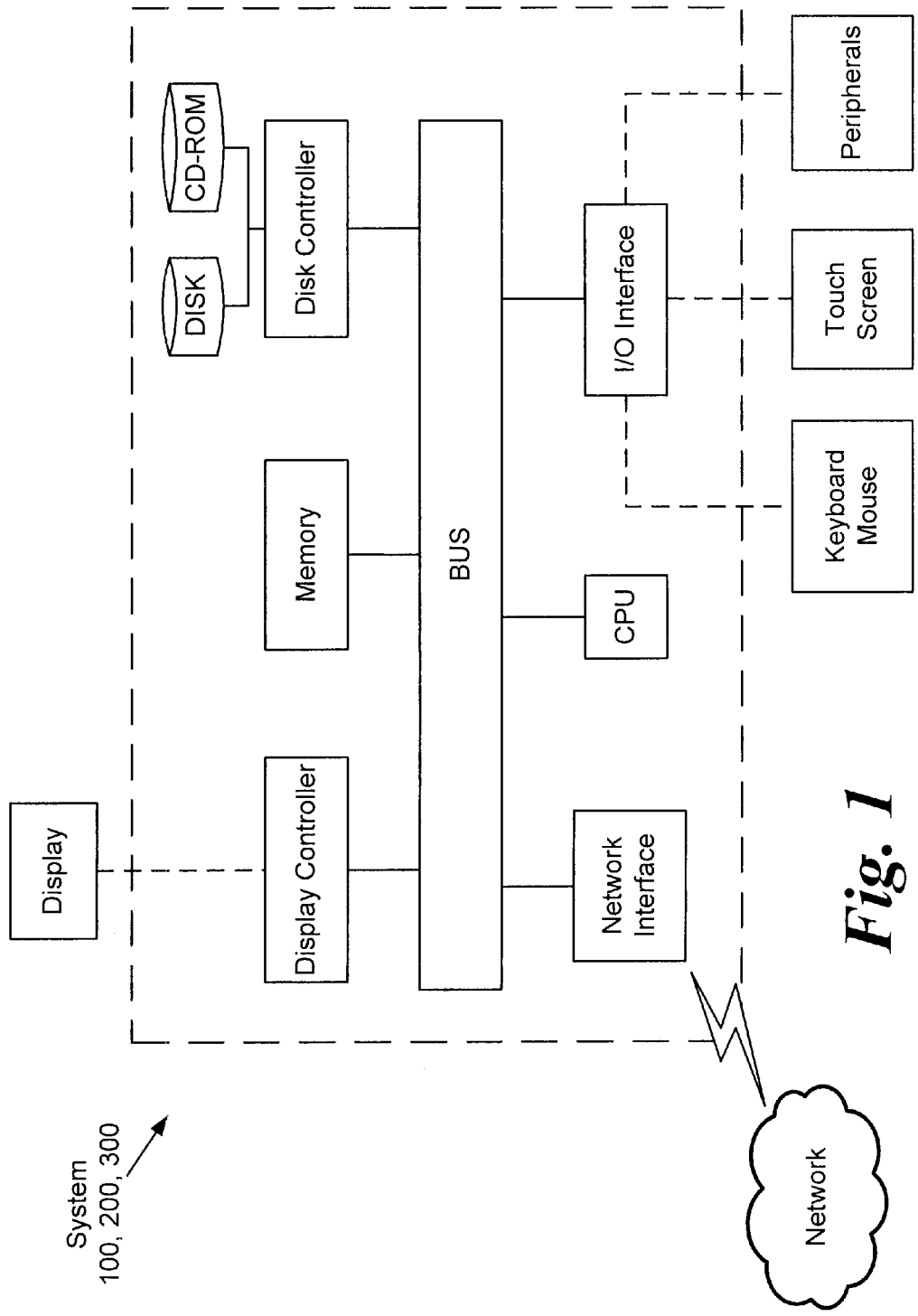
FIG. 1 is a block diagram showing the functional hardware components of preferred implementations of a user system, a provider system and a storage system.

The disclosure will now refer to the drawings, wherein like reference numerals designate identical or corresponding parts throughout the several views. It should be appreciated the drawings merely embody exemplary and preferred aspects of this disclosure.

FIG. 1 shows an exemplary structure for a user system 100, a provider system 200 and a storage system 300. Generally, these systems include computer hardware components that are either individually programmed or execute program code stored on various recording medium, including memory, hard disk drives or optical disk drives. As such, these systems can include application specific integrated controllers and other additional hardware components.

In an exemplary aspect, the user system 100 is a personal computer that includes a central processing unit (CPU) connected to a network interface and a display. The personal computer communicates with other systems via a network, such as the Internet. Such a personal computer also generally includes an input/output interface, including a keyboard, mouse, touch screen, and/or other input peripherals. Through these devices, a user controls operations of a web browser application of the personal computer to communicate with other systems (specifically, systems 200 and/or 300) via the Internet.

A particular implementation according to this disclosure uses a personal computer loaded with a MICROSOFT operating system, such as WINDOWS 7, and a web browser such as INTERNET EXPLORER (e.g., INTERNET EXPLORER 7). However, it should be appreciated by one of ordinary skill in the art that various operating systems and web browsers can be used without deviating from the scope of the claimed invention. Additionally, the personal computer may execute an alternative software-based program, where web browsing is a function thereof.

Preferably, the web browser of the personal computer (or the web browsing functions of the personal computer) are capable of establishing a secure connection through the Internet using, for example, the https protocol for conducting payment transactions through the Internet. However, it should be appreciated that this disclosure is not limited to such secure transactions. This is merely a preferred aspect which provides for a secure and trusted environment between the systems 100, 200 and 300.

The provider system 200 and the storage system 300 can be similarly configured. In a preferred aspect, the provider system 200 includes a web based server platform for hosting a web based application, which a user of the user system 100 can access, for conducting web based transactions. Although numerous operating systems are compatible with teachings of this disclosure, the provider system 200 and the storage system 300 may operate on a Microsoft Server operating system platform, such as Windows Server 2008.

The provider system 200 is a web based server of a financial institution, such as a bank, which provides account administration, bill payment and money transfer functions. In another aspect, the provider system 200 is a server for an online, web based merchant, which provides various goods for user purchase.

The provider system 200 can thus be connected to various other systems, not shown, for payment and billing authorization and shipping of goods to a user of the user system 100. These various other systems can include credit card authorization systems and address confirmation systems.

The storage system 300 preferably includes a server for receiving information and data from the user system 100 and the provider system 200. In preferred aspects, as discussed below, the storage system 300 includes a web based platform for either of the user system 100 and the provider system 200 to access transaction records stored thereon. In such aspects, the storage system 300 serves as a platform for viewing and/or delivering transaction records to the user system 100 and/or the provider system 200. The storage system 300 preferably operates a server operating system to provide web based data transactions, such as Windows Server 2008. However, numerous other server operating systems are readily available.

Figure 2:
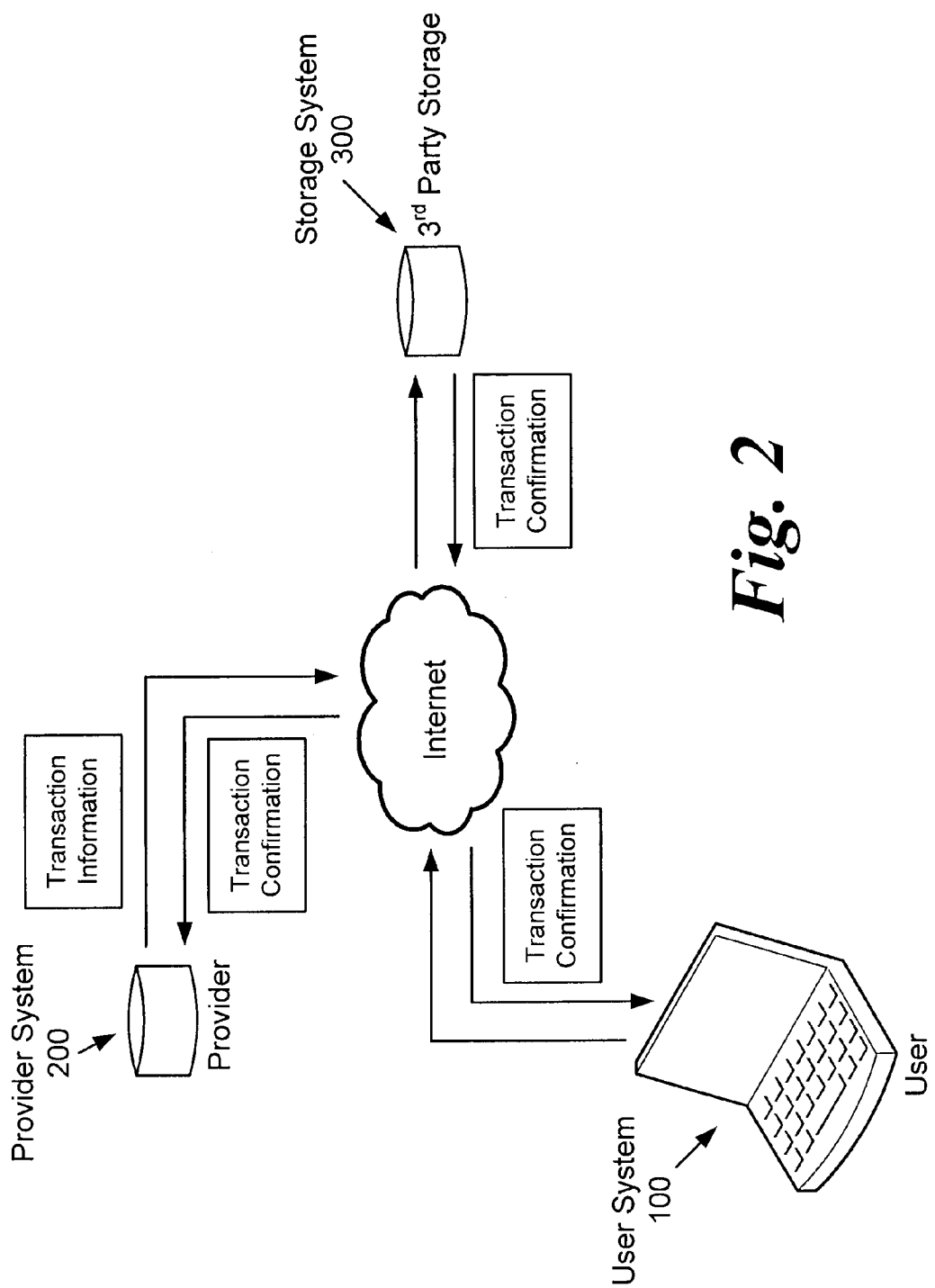
FIG. 2 is a block diagram showing the interconnection of a user system, a provider system and a storage system.

FIG. 2 shows a block diagram of the bidirectional communication of the user system 100, provider system 200, and the storage system 300 via the Internet. Also, FIG. 2 shows the storage system 300 as an independent third party storage system, where the user system 100 and the provider system 200 can be the first and second parties, respectively.

The storage system 300 is independent from, or separated from, the user system 100 and the provider system 200 by being, for example, a different legal entity or a different company. The storage system 300 is thus preferably part of an entity which stores business or transaction records for multiple customers and companies that are separately owned.

According to aspects of this disclosure, the entity including the storage system 300 does not collect and/or process the financial aspects of the transaction or the transaction requests discussed herein. In other words, a user of the user system 100 does not transmit a payment or payment information to the storage system 300 as part of a transaction request for goods or services with the provider system 200.

The operation and configuration of the above-introduced systems will now be discussed in view of the algorithmic state diagrams shown in FIGS. 3 and 4. It should be appreciated that aspects of the algorithms shown in FIGS. 3 and 4 are merely preferred aspects, and differing aspects between the algorithms can be combined, other than shown, without detracting from the scope of this disclosure.

Figure 3:
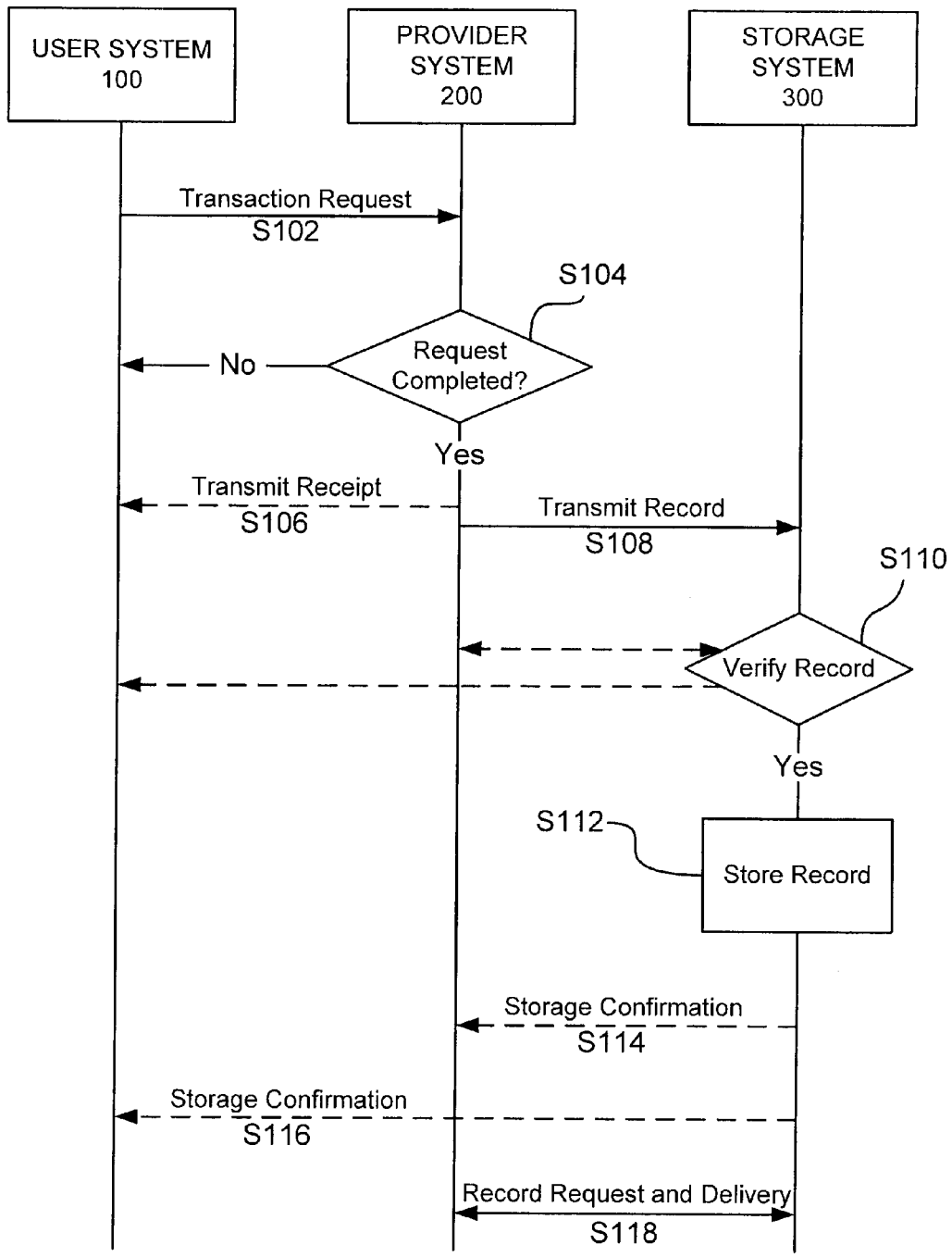
FIG. 3 is an algorithmic state diagram explaining an algorithm according to one aspect of this disclosure.
Figure 4:
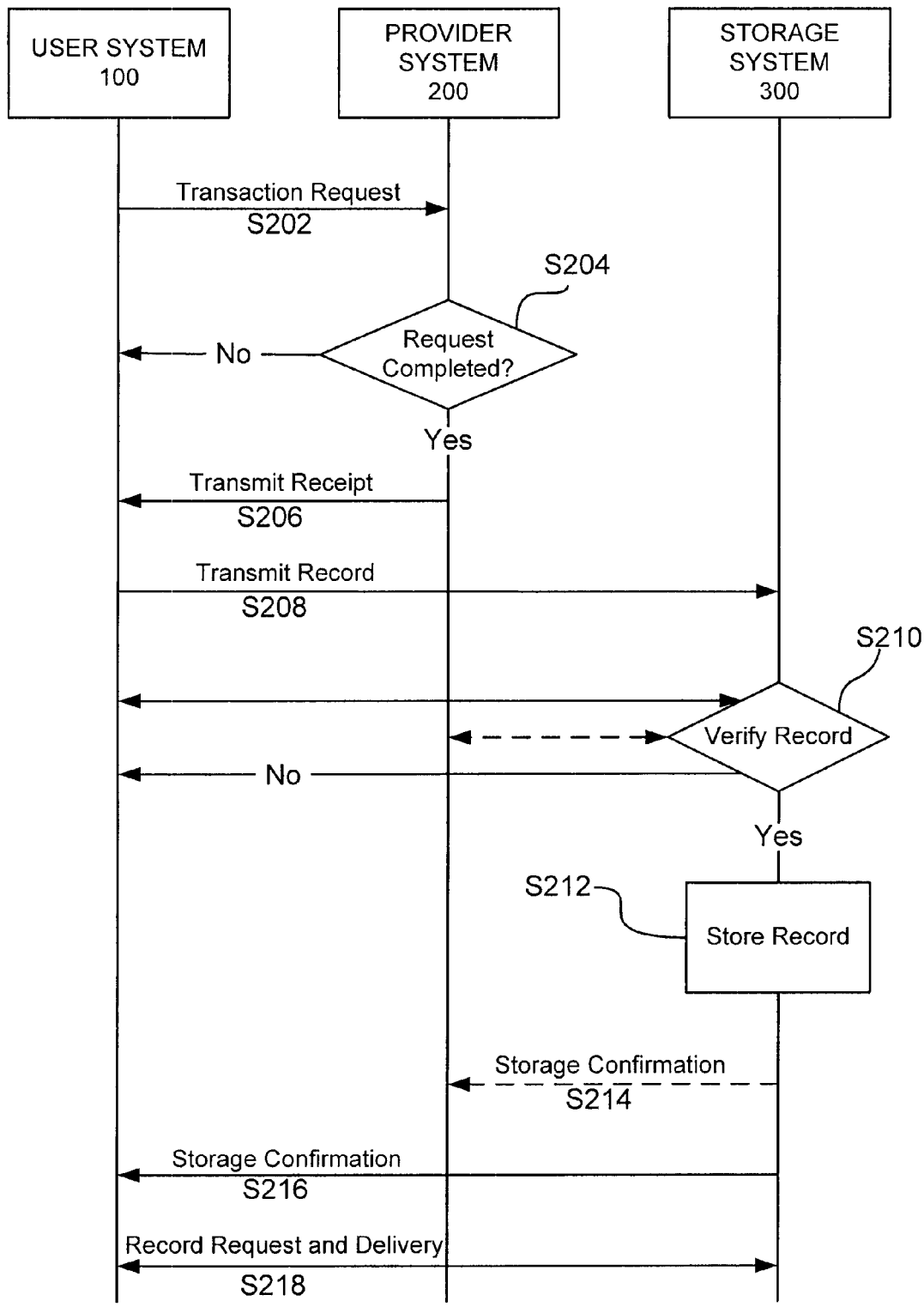
FIG. 4 is an algorithmic state diagram explaining an algorithm according to another aspect of this disclosure.

According to FIG. 3, the user system 100 submits a transaction request at S102 to provider system 200. This transaction request may include a transaction to purchase a good or conduct a service, which is provided by the system 200. Examples of such goods and services include financial transactions and the purchase of consumer goods (or a combination thereof). In preferred aspects, the transaction is conducted by transmitting payment or the order request directly from the user system 100 to only the provider system 200, without using the storage system 300 as a broker.

However, it should be appreciated that alternative payment methods, such as those provided by PAYPAL Inc., can be incorporated into aspects of this disclosure for providing additional functionality and payment options. In this alteration, the user system 100 operates to deliver payment to the provider system 200 through a broker (such as PAYPAL Inc.) so that the provider system 200 can complete the transaction at S104.

Once the provider system 200 has completed the transaction request at S104, a receipt is transmitted to the user system 100 at S106, and in response to completing the transaction request at S104, a record is transmitted to the storage system 300 at S108. The determination of whether the transaction request is completed at S104 is not necessarily indicative of a situation where a relationship between a user of the user system 100 and a provider of the provider system 200 is completed. That is, a completion of the transaction request doesn't necessarily indicate the transaction itself is completed. A transaction request that is completed in accordance with S104 includes receiving payment for a good purchased by the user from the provider or a confirmation of available funds for a transfer of funds from one account at a financial institution to another account, even though goods or funds still need to be shipped or transferred. If the transaction request is not successfully completed, the user system 100 is notified of the same at S104.

The receipt transmitted from the provider system 200 to the user system 100, at S106, can include a combination of email confirmations, web page display confirmations and other automatically generated confirmations of the transaction. It should be appreciated, however, that the transmission of a receipt from the provider system 200 to the user system 100 at S106 is merely preferred and not required in accordance with several of the described aspects.

A receipt in accordance with this disclosure can include any type of text or image-based transmission provided by the provider system 200. Generally, the receipt will be an html or text-based web page or email. However, the provider system can also provide a receipt as an image, such as a jpeg or tiff file, or a PDF file.

The record transmitted from the provider system 200 to the storage system 300 is preferably identical to the receipt transmitted to the user system 100 at S108. In preferred aspects of this disclosure, the provider system 200 generates the record to be transmitted by generating a file in accordance with PDF, based on the receipt transmitted to the user system 100. Generating a record in this aspect can include printing-to-PDF, which uses a PDF printer driver to convert a file into a PDF file. Such functionality can be provided by, for example, ADOBE ACROBAT, which is a software program provided by ADOBE SYSTEMS INCORPORATED, Mountain View, California. However, other such PDF converters/printers are available. The generated PDF record preferably includes metadata identifying the details of the transaction, which are discussed in more detail below. However, the metadata may also be included in a separate file, such as a text or XML file.

The above-noted metadata refers to information about the details (information) of the transaction. That is, the metadata describes the details of the transaction. As used herein, the metadata refers to categorized (structured) values, where each detail of the transaction has a value and a corresponding category. With such a structure, the metadata is useful, especially by the storage system 300, in performing text-based and category-based searching for a record among a plurality of records. Accordingly, it is preferred the storage system 300 includes a metadata database storing the metadata of records which the storage system 300 securely stores.

By using a PDF record (or a similarly formatted record containing similar metadata), the provider system 200 is able to generate a file which has image and display format characteristics that resemble a standard receipt issued by the provider. Thus, the provider can maintain some certainty as to authenticity of the record. Additionally, image-based document security systems can be used to enhance the authenticity of the record, such as watermarking. By incorporating details of the transaction as metadata items of the PDF record, these image-based enhancements are maintained while ensuring the details of the transaction are readily available. Furthermore, the PDF record itself can be encrypted and stored in a secure manner to enhance authenticity of the record.

The record can also be formatted otherwise, including plain text, HTML, XHTML, etc. Such formats preferably include metadata embedded therein, including meta elements which provide structured metadata about a web page. These formats are preferred when the provider system 200 contains an integrated module for connecting to the storage system 300 via a secure connection. In this aspect, taking a web merchant as an example, a user is given an option of selecting a "secure storage checkout" when purchasing a good through the provider system 200. When this "secure storage checkout" option is selected, a standard checkout procedure can be performed while the provider system 200 communicates the transaction record to the storage system 300. An exemplary screen shot of a "secure storage checkout" option is shown in FIG. 5.

Figure 5:
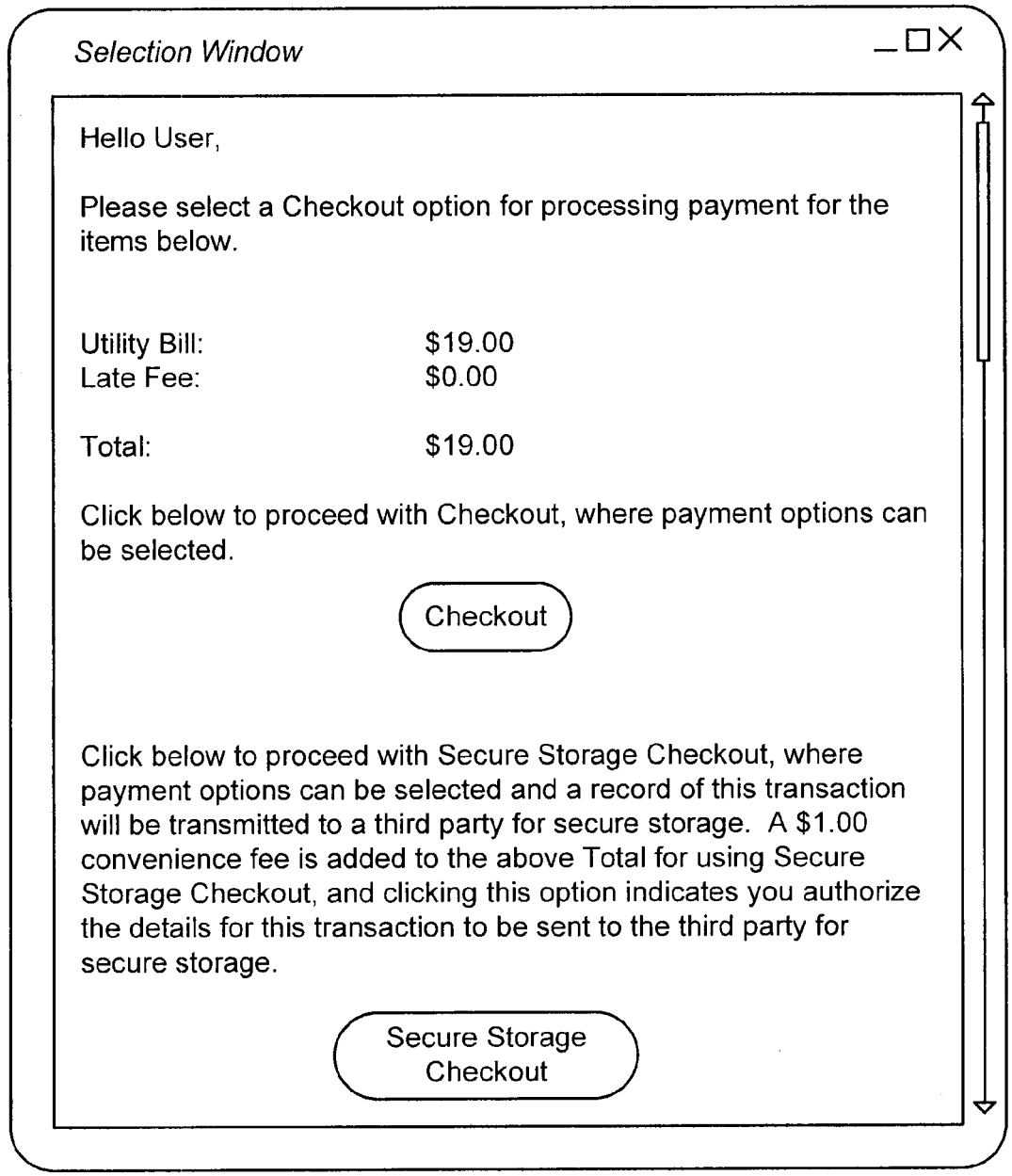
FIG. 5 shows an exemplary screen shot of a user selecting a secure storage checkout option from a provider system.

FIG. 5 illustrates a screen that is transmitted, via a web browser, to the user system 100 to both confirm an order and proceed with a checkout process, which includes payment and/or deliver selections by the user. The screen shown in FIG. 5 relates to a utility payment to a company named Utility, which is the provider in this non-limiting example. Here, the user is about to proceed with a checkout process for payment of a $19.00 utility bill. However, the screen in FIG. 5 is offering the user an option of selecting a secure storage checkout, and informs the user that a record of the transaction will be transmitted to a third party for secure storage for a $1.00 convenience fee. Once selected, the checkout process will continue by collecting user billing and payment information for processing the payment to the provider to complete the transaction request. Once completed, the provider will transmit a record thereof to the third party (e.g., the secure storage system 300).

Adverting back to FIG. 3, upon receipt of the transmitted record, the storage system 300 can verify the record at S110. The verification performed at S110 preferably includes a verification that the file received in the transmitted record at S108 is formatted correctly (specifically, formatted as a PDF with appropriate metadata). However, in other aspects, the verification performed at S110 includes communication with the user system 100 and/or the provider system 200 to confirm the details of the transaction.

Either through an automated internal process, or through instruction from the provider system 200 or the user system 100, the storage system 300 then stores the verified record at S112. In preferred aspects, upon successfully storing a verified record, the storage system 300 sends a confirmation of storage to the provider system 200 at S114 and a confirmation of the storage to the user system 100 at S116.

Later in time, the provider system 200 is able to access the storage system 300 to request a record and delivery thereof at S118. Although not shown, the user system 100 can make a similar request for delivery.

The aspect of this disclosure described above and shown in FIG. 3 is capable of performing the record storage processes without any user interaction, and thus can be performed "provider-side." Specifically, instead of offering a user an option for secure storage, as shown in FIG. 5, secure storage may be automatically performed without user intervention.

Additionally, the convenience fee for selecting secure storage checkout in FIG. 5 is merely one aspect. In a further aspect, the provider does not include a convenience fee charge for selecting secure storage checkout. For example, when the provider is not a utility company, but rather a financial institution such as a bank or an online vendor (merchant), the option for selecting a secure storage checkout or secure storage transaction is preferably provided to the user without a convenience fee charge.

Adverting back to FIG. 3, in the above aspects, the record transmitted at S108 should include details which identify either the user system 100 or the user of the user system 100 so that, for example, the user or the provider can query the storage system using the identity details. Preferably, such a detail is an email address of the user. However, alternative aspects can include the user registering a username and password with the storage system 300 and/or the provider system 200, where these systems transmit and store records in accordance with a filing system that organizes the records by the username.

With the use of an email address, however, the verification of the record at S110 can be performed by transmitting an email to the user of user system 100 or the user system 100 itself. Additionally, the storage confirmation transmitted at S116 can be transmitted via the email. Also, a record request and delivery performed by the user system 100 (not shown in FIG. 3) can be performed by the user accessing the storage system 300 by providing details of the transaction as authentication, including the email transmitted in the record at S108 by the provider system 200.

An alternative employment of the algorithm discussed above in relation to FIG. 3 is shown in FIG. 4. Generally, the algorithm shown in FIG. 4 contains processes similar or identical to those shown in FIG. 3. Accordingly, for brevity, further description of these procedures is omitted.

Referring to FIG. 4, at S202, user system 100 transmits a transaction request to provider system 200. At S204, a determination is made as to whether the transaction is successfully completed. If so, a receipt is transmitted to the user system 100 at S206.

The user system 100 will then transmit a record to the storage system 300 at 5208. The user system 100 can generate a record by various means.

In one embodiment, the user system 100 formats the receipt into a PDF file including metadata (using, for example, a print-to-PDF driver). The metadata includes details of the transaction. The metadata details are discussed in more detail below with reference to FIGS. 7-10, discussed below.

In a preferred embodiment, the web browser of the user system 100 can include a plug-in, which is an additional program installed on top of the web browser. The plug-in can be installed onto an Internet Explorer web browser by way of an ActiveX control, which can originate from a web page of either the provider system 200 or the storage system 300. It should be appreciated similar plug-ins are envisioned for other implementations which involve different web browser or server platforms, as those skilled in the art would appreciate.

Nonetheless, such a plug-in detects a to-be-recorded transaction based on a web page URL accessed through the web browser, and automatically formats and transmits a web page delivered confirmation HTML from the provider system 200. In one embodiment, the plug-in incorporates a print-to-PDF driver that creates a PDF file including metadata of the details of the transaction.

Figure 6:
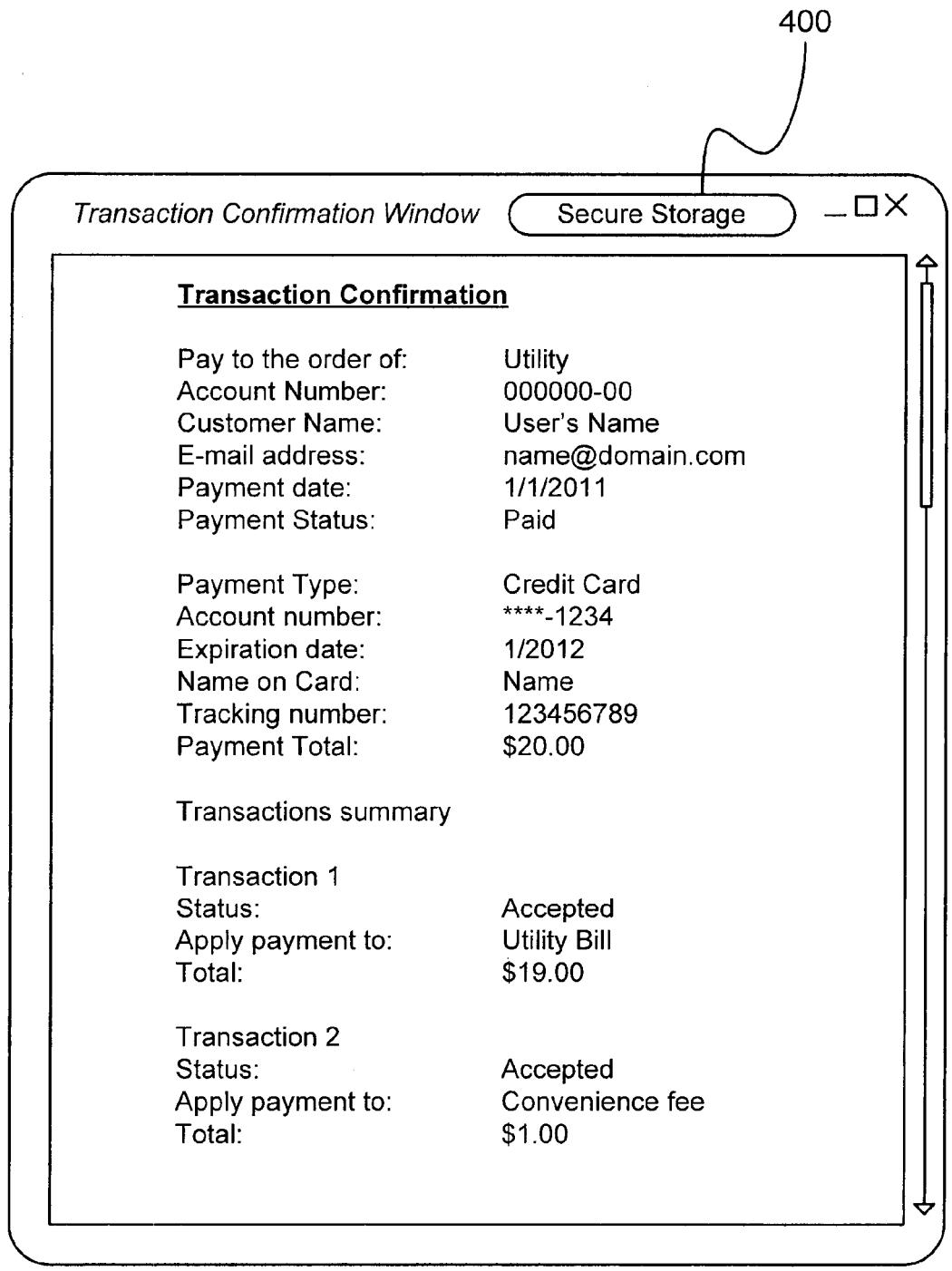

Another implementation of the plug-in is shown in FIG. 6, which is a window of a web browser including the plug-in. Specifically, the content of the window shown in FIG. 6 includes a confirmation of the utility bill payment referred to in FIG. 5. Details of the transaction are included in the confirmation, including payment information and account number. As an interactive button of the window, "secure storage" option 400 is shown, which activates the plug-in.

When the user system 100 receives an image-based receipt that does not include embedded text, but rather an image of text, the user system 100 can perform optical character recognition to recognize text within the receipt, including the details of the transaction. This optical character recognition can also be a function of the plug-in. From there, the user system 100 will store the text (i.e. the details of the transaction) as metadata of the image-based receipt, and form a file thereof (such as a PDF file) as a record for transmission.

In another embodiment, the web browser plug-in is integrated into an e-mail software application that similarly formats a received e-mail at the user system 100 as a PDF file, which is then transmitted to the storage system 300. Alternatively, the user system 100 transmits the record as a text document including identifiers for indicating particular details of the transaction. However, it should be appreciated that those skilled in the art can modify the system and procedures described herein to use other file formats and forms of metadata.

Adverting back to FIG. 4, the storage system 300 verifies the record transmitted from the user system 100 at S208. This procedure is similar to the procedure described via FIG. 3. However, the storage system 300 can verify the record by establishing a communication link with the plug-in of the web browser, if the user system 100 is so configured. With such a link established, the plug-in and the storage system 300 can communicate the details of the transaction, and the user can confirm or modify the details as appropriate. As will be discussed later, exemplary windows used for confirming metadata entries is shown in FIGS. 9-10. If no such link is established, the user system 100 can communicate with the storage system 300 via the web browser, preferably via a https connection, where a user can be notified of the transaction details the storage system 300 is verifying.

Optionally, the provider system 200 can be configured to communicate with the storage system 300 to verify the record that has been transferred from the user system 100. This system is the most beneficial for the user of the user system 100, because it confirms the user is in possession of a receipt which accurately depicts the details of the transaction that are to be recorded by the storage system 300, and the provider system 200 has confirmed those same details. Thus, a high level of authenticity for the record is provided since the provider, through the provider system 200, has confirmed the details of the transaction now to be stored by the storage system 300.

If the record cannot be verified, then the user system 100 is notified appropriately. Otherwise, the record is stored by the storage system 300 at S212 and appropriate confirmations are transmitted. In particular, if the provider system 200 is capable of receiving the confirmation, then a storage confirmation is sent thereto at S214. Nonetheless, since the record originated from the user system 100 at S208, the user system 100 receives a storage confirmation at S216.

At a later time, the user system 100 can access the storage system 300 to request a record and delivery thereof at S218. In a similar fashion, although not shown, the provider system 200 can request a record and delivery thereof.

Preferably, the record transmitted at S208 includes details which identify the user of the user system 100, thereby facilitating access to the record by the user at a later date. Preferably, an email address is used as a detail of the transaction.

Referring now to FIGS. 7 and 8, details of records transmitted in the above-described embodiments are shown. FIG. 7 shows an example transaction record between the user and the utility provider previously referred to in FIGS. 5 and 6. This transaction identifies the utility provider as "Utility," with an account number of the user, an email address of the user and payment information. The payment information includes credit card information, payment date, and other information. Although not shown, the transaction record can further include mailing, shipping or billing addresses, as appropriate for the nature of the particular transaction.

FIG. 8 shows a transaction confirmation for a bank transfer, specifically a transfer of $100.00 from one account to another account. The transaction record indicates the amount, the "from" account, the "to" account, and the banks associated with each account. Similar to the utility record in FIG. 7, FIG. 8 shows user details and a date the transfer was requested.

In preferred aspects, a metadata entry is prepared and generated for each of the details shown in FIG. 7 or FIG. 8. In particular, since email is a readily available piece of information that a user is very likely to remember and generally personally identifies the user, the email address of the user is a preferred metadata item to store because it can be easily used by a user or a provider at a later time to access a transaction record for that particular user among a plurality of transaction records for a plurality of different users.

Other metadata items may include separate transactions or line-items of the transaction, as shown in FIG. 7 by transaction 1 and transaction 2. Transaction 1 is an accepted payment applied to a utility bill for $19.00. Transaction 2 is an accepted payment for a convenience fee charge of $1.00. Since employments of the embodiments disclosed herein may include a service contract between a provider and an independent secure storage service, convenience fees may be applied to transactions according to this disclosure.

FIGS. 9-10 show examples of metadata associated with the records shown in FIGS. 7-8, respectively. Such windows are transmitted to the user or the provider when verifying transaction details (S110 and S210) or requesting records (S118 and S218).

The metadata shown in FIGS. 9-10 is information concerning the details of the transaction records of FIGS. 7-8, respectively, and are shown to the user or the provider by way of a display window categorizing the metadata entry with an identified category. For example, taking FIG. 9, "File Name:" is a category item for a file name of the transaction record, which has a value of "Transaction.PDF" in this example. Further, under Transaction 1, "Payment:" is a category item for a payment, the value of which is $19.00.

The categories displayed in the windows shown in FIGS. 9 and 10 vary depending on the type of transaction. In particular, when the transaction is a money transfer between accounts, pursuant with FIG. 10, the categories include originating bank ("from" bank) and destination bank ("to" bank) categories with appropriate values associated therewith (i.e. "Bank 1" and "Bank 2"). Also, corresponding account categories are included with appropriate values (i.e. 000000-01 and 000000-02).

Although FIGS. 7-10 show examples of transaction records and metadata entries for credit card payments to a utility company and a bank transfer, this disclosure is not limited thereto. As noted above, various payment methods can be used and various web based merchants and financial institutions can be identified by a transaction record. As a result, this disclosure applies to a wide variety of web based transactions, including but not limited to the purchase of goods or services, user-service (contract) agreements, bill payment, downloadable software purchases, downloadable media content purchases and financial transactions (including account transfers and bill payment). Further, various metadata categories should be appreciated by those skilled in the art for each of these types of web based transactions.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of confirming a transaction between a user system and a provider system, comprising:
receiving, from a user system, a request for a transaction to be performed by a provider system, the transaction including a purchase of goods or a conduction of services between a user of the user system and a provider of the provider system;
transmitting, in response to the provider system completing the transaction request, a record from the provider system to a storage system independent of the user system and the provider system, the record including details of the transaction including the goods purchased or services conducted between the user and the provider; and
receiving, from the storage system by the provider system, a transaction confirmation which confirms storage of the record by the storage system.

2. The method recited in claim 1, further comprising:
verifying the details of the transaction between the provider system and the storage system.

3. The method recited in claim 2, wherein the verifying includes receiving, at the provider system, metadata extracted or read from the record by the storage system, where the provider system compares the received metadata with an internal record of the transaction.

4. The method recited in claim 3, further comprising:
transmitting, in response to determining the metadata matches the internal record of the transaction, an indication the record is verified to the storage system, causing the storage system to store the record and generate the transaction confirmation.

5. The method recited in claim 1, further comprising:
transmitting a request for the record to the storage system;
receiving the record in response to the request thereof; and
comparing the received record with an internal record of the transaction.

6. The method recited in claim 1, wherein the provider system completing the transaction request includes the provider system receiving a payment from the user system.

7. The method recited in claim 1, wherein the request for the transaction is performed directly between the user and the provider by way of the user system and the provider system, respectively, without using the storage system as a broker.

8. The method recited in claim 1, wherein the details include an electronic mail address of the user so that the record can be accessed by or delivered to the provider or the user.

9. The method recited in claim 1, further comprising:
generating the record as a file in the portable document format (PDF) including metadata identifying the details of the transaction.

10. A computer-readable medium including instructions, that when executed by a computer, cause the computer to perform a method according to claim 1.

11. An apparatus of a provider system, comprising hardware components, including at least a processor, memory and a network controller, comprising:
means for receiving a request for a transaction to be performed by the provider system from a user system, the transaction request including a request for a transaction to be performed by the provider system, the transaction identifying a purchase of goods or a conduction of services between a user of the user system and a provider of the provider system;
means for transmitting, in response to the provider system completing the transaction request, a record from the provider system to a storage system independent of the user system and the provider system, the record including details of the transaction including the goods purchased or services conducted between the user and the provider; and
means for receiving, from the storage system by the provider system, a transaction confirmation which confirms storage of the record by the storage system.

12. A method of confirming a transaction between a user system and a provider system with a storage system, comprising:
receiving, from a provider system, a record of a completed request for a transaction between a user of a user system and a provider of the provider system, the transaction including a purchase of goods or a conduction of services between the user and the provider, and the record including details of the transaction including the goods purchased or services conducted between the user and the provider;
storing the record in a database independent of the user system and the provider system; and transmitting, from the storage system, a transaction confirmation to the provider system and the user system which confirms storage of the record by the storage system.

13. The method recited in claim 12, further comprising:
verifying the details of the transaction between the storage system and one of the provider system and the user system.

14. The method recited in claim 13, further comprising:
extracting or reading metadata from the record, wherein the verifying includes transmitting the extracted/read metadata to the provider system or the user system, and generating the transaction confirmation upon successfully verifying the details of the transaction.

15. The method recited in claim 12, wherein the requested transaction is completed based on the provider system receiving a payment from the user system without the payment being brokered by the storage system.

16. The method recited in claim 12, wherein the storing includes storing the record as a file in the portable document format (PDF) including metadata identifying the details of the transaction.

17. The method recited in claim 12, wherein the record includes an electronic mail address of the user of the user system, and the method further comprises:
transmitting the record to the user system in response to the user system (1) accessing the storage system via the electronic mail address and (2) requesting the record from the storage system.

18. A computer-readable medium including instructions, that when executed by a computer, cause the computer to perform a method according to claim 12.

\* \* \* \* \*